AMPLIFIER NEUTRALIZATION BY R.F. FEEDBACK

Filed Dec. 17, 1962 2 Sheets-Sheet 1

INVENTOR.
Francis R. Steel
BY George J. Niman
Mueller & Aichele
Attys.

INVENTORS
Francis R. Steel
George J. Niman
BY
Mueller & Aichele
Attys.

United States Patent Office 3,204,194

Patented Aug. 31, 1965

3,204,194

AMPLIFIER NEUTRALIZATION BY R.F. FEEDBACK

Francis R. Steel, Northbrook, and George J. Niman, Chicago, Ill., assignors to Motorola, Inc., Chicago, Ill., a corporation of Illinois Filed Dec. 17, 1962, Ser. No. 245,150
8 Claims. (Cl. 330—79)

This invention relates to amplifier circuits and more particularly to a radio frequency amplifier capable of providing a high degree of current feedback for the reduction of intermodulation distortion.

Tuned radio frequency amplifiers of the type commonly employed in communication transmitters tend to generate intermodulation products because of the inherent non-linearity of their active elements. These distortion products appear as new frequencies in the amplifier output whenever a signal consisting of two or more frequencies is applied to the input. In many cases, such as in single sideband systems using closely spaced frequencies, this intermodulation interference transmitted on adjacent and other channels is a limiting factor in system performance. It is known that such distortion can be substantially reduced or eliminated by employing proper amounts of degenerative feedback for each amplifier channel. The degree of reduction of intermodulation distortion is proportional to the amount of degenerative feedback used. However, the amount of such feedback is limited by stability requirements since the phase angle of the feedback loop gain shifts with frequency, tending to make the feedback regenerative. If the loop gain exceeds unity and the phase is simultaneously shifted 180° at any frequency, the amplifier will oscillate. Phase shift depends on the number and selectivity of tuned circuits in the feedback loop.

Because of reactive components introduced in the plate-to-cathode current path by interelectrode capacities of electron tubes, current feedback (i.e. a feedback voltage which is proportional to the amplifier output current) is not generally used at radio frequencies. Voltage feedback, however, is subject to variations in both phase and magnitude as the result of output load variations and phase shifts introduced by the output tuned circuit of the amplifier to limit the amount of feedback which may be employed without introducing oscillations in the feedback loop. For the relatively high impedance final stages commonly used in communication transmitter channels current feedback is substantially independent of the load variations which result in the limitations associated with voltage feedback. For example, when tetrode or pentode vacuum tubes are used as the output amplifier, the output voltage has little effect upon the electronic plate current as long as the instantaneous plate voltage remains greater than the screen voltage. Accordingly, a higher degree of current feedback for the reduction of intermodulation distortion is possible if means can be further provided to eliminate reactive components in the plate-to-cathode current path.

It is therefore an object of the present invention to provide improved means for obtaining current feedback in tuned radio frequency amplifier stages.

Another object is to provide improved means for obtaining current feedback for the reduction of intermodulation distortion in a radio frequency amplifier channel, which feedback is independent of load variations.

A further object is to provide means for obtaining current feedback while at the same time neutralizing the effects of interelectrode capacities so that more degenerative feedback can be employed for the reduction of intermodulation distortion in tuned radio frequency amplifier stages.

A feature of the present invention is the provision of a feedback transformer in the plate-to-cathode circuit of a tuned radio frequency amplifier stage for obtaining feedback current from such stage, with the transformer also having auxiliary windings to neutralize the effect of interelectrode capacities of the stage from which the feedback is obtained.

Another feature is the provision of a feedback transformer in the cathode current return path of a tuned radio frequency amplifier stage to provide feedback current which is independent of load current variations of the amplifier and which further provides neutralization of current introduced into the cathode circuit by interelectrode capacities of the amplifier stage.

The feedback circuit of the present invention includes a feedback transformer having a primary winding connected in series in the plate-to-cathode signal path of an electron tube of a tuned RF amplifier stage. A degenerative feedback signal proportional to current induced in the secondary winding of the transformer is applied to preceding stages for the reduction of distortion. The feedback transformer further includes auxiliary windings to introduce currents of equal magnitude but of opposite phase to reactive currents flowing in the primary of the feedback transformer as a result of interelectrode capacities of the electron tube. Thus, the net primary current is only the electronic plate current and the elimination of currents affected by the load and the output tuned circuit enables more feedback to be employed without oscillations occurring in the feedback loop.

Figure 1:
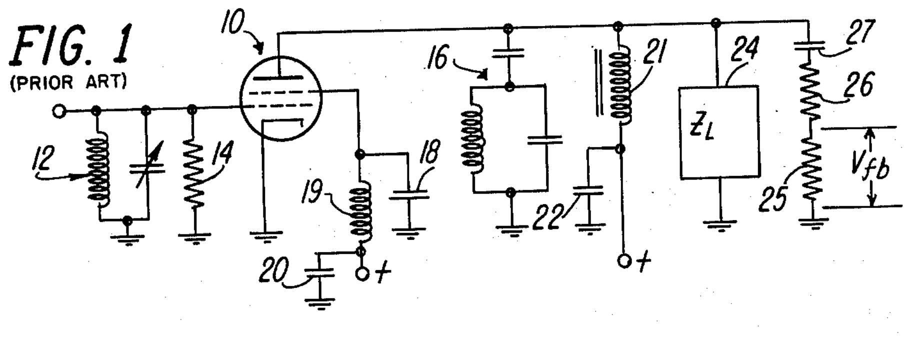
FIG. 1 (PRIOR ART)
FIG. 1 is a schematic diagram illustrating the conventional manner in which voltage feedback is obtained in a tuned amplifier stage.
Figure 2:
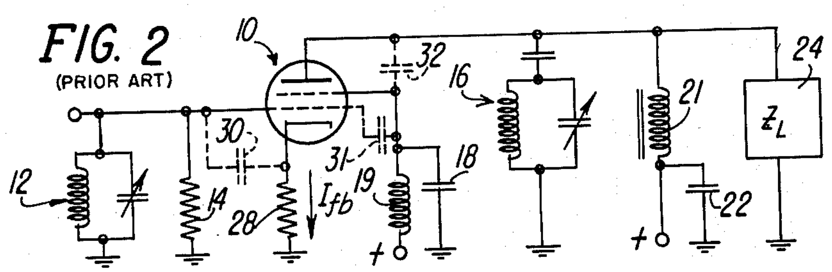
FIG. 2 (PRIOR ART)
FIG. 2 is a schematic diagram illustrating means for obtaining current feedback and further showing some of the interelectrode capacities which tend to introduce unwanted reactive current components in the current feedback path at radio frequencies.

With reference to FIG. 1 there is shown a screen grid tube such as a tetrode 10 connected as a radio frequency power amplifier. Because of lower interelectrode capacities than triodes, and because of greater power handling capacities than pentodes, such tubes find wide application as high level stages in radio frequency amplifier channels. In its simplest form, the circuit of FIG. 1 has an input network including tuned circuit 12 and grid resistor 14 connected between the control grid electrode of tetrode 10 and ground reference potential. An output tuned circuit such as tank circuit 16 is connected between the anode electrode and ground reference potential. The screen electrode is maintained at RF ground potential by capacitor 18 and screen grid potential is supplied from an isolation network including RF choke 19 and bypass capacitor 20. B+ for the anode electrode is supplied from a similar filter network including choke 21 and capacitor 22. An output load impedance $Z_L$ for tetrode 10 is represented by impedance 24, connected between its anode electrode and ground reference potential. It is to be understood that in a practical circuit this load may be a utilization device such as a transmitting antenna, or the input coupling to subsequent stages. It is further to be understood that in a practical operating environment load impedance 24 is subject to change in both phase and in magnitude. A voltage dividing network including resistors 25 and 26 and blocking capacitor 27 provide a feedback voltage $V_{vfb}$ in the well-known manner so that by suitable connection to the tap point between resistors 25 and 26 a voltage feedback signal is available for coupling to the other stages.

Where current feedback is desired, the amplifier stage of FIG. 1 may be modified as shown in FIG. 2. An impedance inserted in series with the plate-to-cathode signal path, such as resistor 28, provides a feedback voltage thereacross that is proportional to the current flowing in this path. By writing the loop equations for the equivalent circuit for an amplifier stage, considering electron tube 10 as a constant voltage generator producing a voltage $-\mu_{eg}$ and having an internal plate resistance of $r_p$, the feedback voltage and the feedback current respectively of FIGS. 1 and 2 may be expressed by:

$$V_{vfb}=\frac{K_1\mu_{eg}Z_L}{r_p+Z_L} \quad (1)$$

$$V_{cfb}=\frac{\mu_{eg}K_2}{r_p+Z_L} \quad (2)$$

In the above expressions, $K_1$ and $K_2$ are constants depending on the amount of feedback that is to be employed. In a practical case where $r_p$ is large compared to $Z_L$ the above expressions may be approximated by $$V_{vfb}=\frac{K_1\mu_{eg}Z_L}{r_p} \quad (3)$$

$$V_{cfb}=\frac{\mu_{eg}K_2}{r_p} \quad (4)$$

It is apparent from an inspection of Expressions 3 and 4 that voltage feedback is proportional to the value of $Z_L$ while current feedback is independent of $Z_L$. The changes in phase and magnitude of $Z_L$, as often occurs when $Z_L$ is developed across a sharply tuned circuit in the output stage of an RF amplifier, can result in regeneration and oscillations in the feedback loop, and it is therefore necessary to limit the amount of voltage feedback that can be employed in a practical circuit.

Since current feedback is substantially independent of variations in load impedance of the final stage in instances where the internal plate resistance is high with respect to the load impedance coupled to the stage, it is possible to utilize a higher degree of current feedback and thereby include a larger number of stages in the feedback loop. However, as shown in FIG. 2, interelectrode capacities 30, 31 and 32 as well as the output capacitance of the tube, provide additional signal paths at radio frequencies to introduce reactive currents in the plate-to-cathode current path, and such reactive currents may result in regeneration in the current feedback loop. For this reason it has been heretobefore considered more practical to use voltage feedback in conjunction with tuned RF amplifiers, not withstanding limitations caused by load impedance changes.

In accordance with the present invention, current feedback is provided which is proportional only to electronic plate current and which is subtsantially independent of load impedance variations and phase shift characteristics of the output tuned circuit. Referring to the circuit of FIG. 3, wherein like reference numerals refer to like circuit elements as in FIGS. 1 and 2, feedback transformer 40 is connected with its primary winding 42 in series with the cathode current return path of tetrode 10. Screen bypass capacitor 18 is returned to the cathode of tetrode 10 rather than to ground reference potential. It is apparent from the connection of primary winding 42 that in addition to signal current, radio frequency current will flow from the grid electrode to the cathode electrode by way of interelectrode capacitance 30 and hence to ground. Radio frequency screen current including a non-linear component flows through bypass capacitor 18 to the cathode, thus avoiding feedback transformer 42.

The voltage induced in secondary winding 44 of transformer 40 is proportional to the total current flowing through primary winding 42. With one end of winding 44 connected to ground reference potential and the other end of winding 44 connected across resistor 46 to ground reference potential, a voltage proportional to this current is developed across resistor 46. Connection to a suitable tap point on resistor 46 provides the desired degree of current feedback which is available to be fed back as a degenerative feedback signal to earlier stages in the amplifying system for reduction of intermodulation distortion.

To reduce reactive current components introduced by grid-to-cathode interelectrode capacitance 30, auxiliary winding 50 is provided on transformer 40 in an opposite sense to secondary winding 44. One end of winding 50 is connected to the grid electrode of tetrode 10 while the other end of winding 50 is series connected by variable capacitor 51 to ground reference potential. By tuning winding 50 with capacitor 51, currents are introduced in transformer 40 which are equal in magnitude but opposite in phase to the grid-to-cathode reactive current component flowing through primary winding 42 so that it may be effectively cancelled.

A second auxiliary winding 52 is also provided on transformer 40 to cancel reactive currents introduced into primary winding 42 by the output capacitance (plate-to-cathode and plate-to-screen) of the tube acting in combination with the plate voltage. One end of winding 52 is connected to ground reference potential and the other end thereof is connected through variable capacitor 53 and fixed capacitor 54 to the anode electrode of tetrode 10. Capacitor 54 is an optional blocking capacitor to keep D.C. plate voltage off of variable capacitor 53. Capacitor 53 is adjusted to a value which allows a current to flow through winding 52 to effectively cancel the undesired currents described above. Thus, the net current flowing through primary 42 of transformer 40, which current is operable to provide current feedback, is only the electronic plate current and does not include unwanted reactive currents introduced by interelectrode capacities of tetrode 10. This reduces the possibility of regeneration in the feedback loop and allows a higher degree of feedback to be available for reduction of intermodulation distortion in earlier amplifier stages. At the same time employment of current feedback rather than voltage feedback provides a feedback signal which is substantially independent of the uncontrollable variations in load impedance and phase shift of the output tuned circuit.

Figure 4:
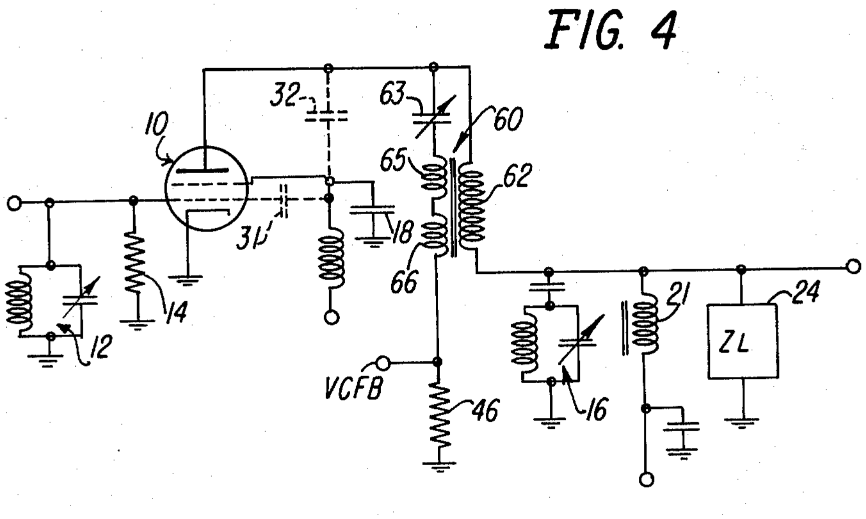
FIGS. 4 and 5 are schematic diagrams showing further circuit embodiments of the invention.

In the embodiment of FIG. 4 primary winding 62 of transformer 60 is series connected in the plate circuit of tetrode 10. Capacitor 63 is adjusted to a value equivalent to the output capacitance of tetrode 10 (plate-to-cathode and plate-to-screen grid) and series connected with auxiliary winding 65 between the plate of tetrode 10 and ground to cancel reactive currents introduced in primary 62 of transformer 60. The voltage developed across resistor 46 by secondary winding 66 is proportional to the electronic plate current of tetrode 10, and the reactive current components are effectively cancelled.

Figure 5:
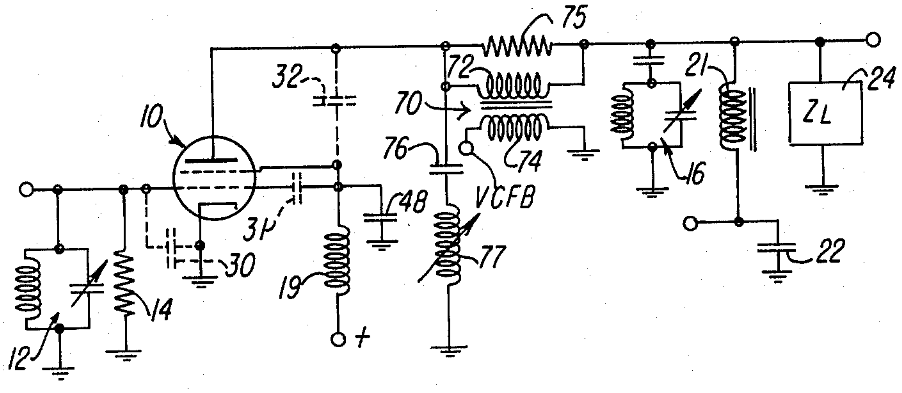

A further embodiment having primary 72 of transformer 70 connected in series with the plate circuit of tetrode 10 is shown in FIG. 5. Resistor 75 is provided in shunt with primary winding 72 to develop a feedback voltage proportional to plate current in secondary winding 74. Capacitor 76 and inductor 77, series connected between the plate of tetrode 10 and ground reference provides for neutralization of the output capacitance of the stage. Inductor 77 is tunable to a value at a given frequency which eliminates the flow of reactance currents in the plate circuit of tetrode 10 so that the feedback voltage developed by secondary winding 74 is proportional only to electronic plate current.

Figure 3:
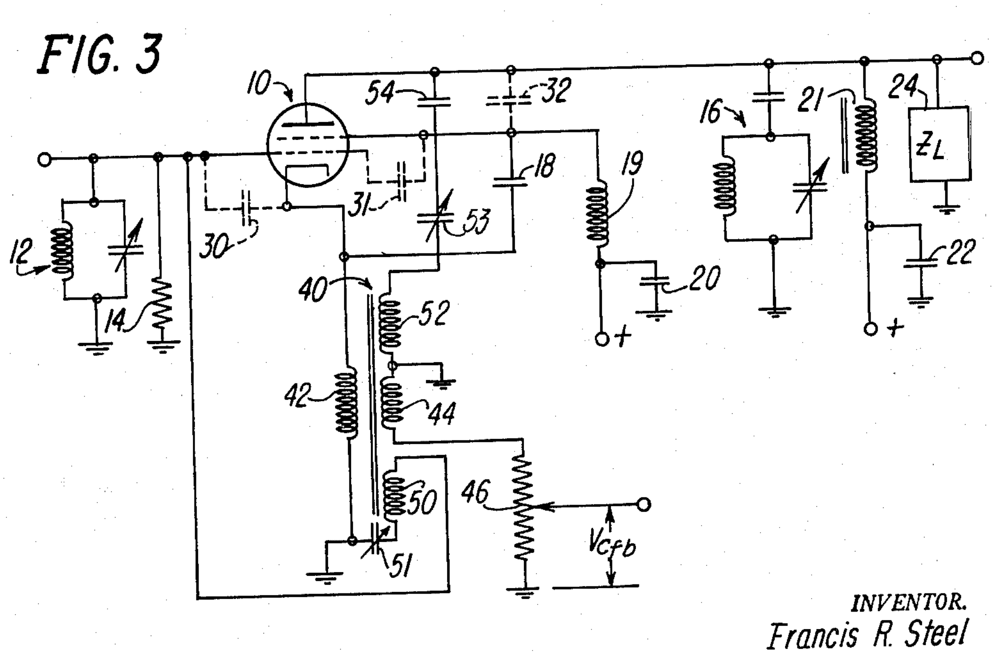
FIG. 3 is a schematic diagram of a radio frequency amplifier stage employing means for obtaining current feedback which is free from unwanted reactive components in accordance with the present invention.

In a particularly successful circuit embodiment as shown in FIG. 3, using a 4CX300A tetrode providing 50 watts output at 10 megacycles, feedback transformer 40 included a 2 turn primary winding 42 on a ⅜" diameter core series connected in the cathode circuit of tetrode 10. The secondary or feedback winding 44 consisted of 7 turns, while auxiliarly windings 50 and 52 consisted of 4 and 3 turns respectively. With this arrangement it was possible to provide sufficient feedback to reduce inter-modulation distortion products by more than 15 db. It is to be understood that these values are typical but not limiting, and that other regrees of current feedback may be obtained depending on the specific type of circuitry used in the amplifier system and upon the frequency at which it is operated.

The invention provides, therefore, an improved means for obtaining a high degree of current feedback from a tuned radio frequency amplifier stage. Reactive currents introduced by tube interelectrode capacities are eliminated from the feedback signal, and the use of current feedback enables the feedback signal to be substantially independent of load impedance variations of the stage from which it is obtained.

We claim:

1. A tuned radio frequency amplifier stage including in combination, an electron tube having at least anode, cathode and control grid electrodes, transformer means having a primary winding series connected between said cathode electrode and a reference potential, with said transformer means further having a secondary winding and first and second auxiliary windings, means connecting one end of said first auxiliary winding to said control grid electrode, circuit means including a variable capacitor connecting the other end of said first auxiliary winding to said reference potential, means connecting one end of said second auxiliary winding to said reference potential, circuit means including a variable capacitor connecting the other end of said second auxiliary winding to said anode electrode, the currents in said auxiliary windings acting to neutralize reactive currents introduced in the sampled current path by interelectrode capacitance of said electron tube, circuit means including resistance means connecting said secondary winding to the reference potential, and means connected to said resistance means for deriving therefrom a signal indicative of the anode-to-cathode electronic current of said tube.

2. In a tuned radio frequency amplifier stage including an electron valve having at least anode, cathode and control electrodes, circuit means for providing a feedback signal which is substantially independent of the load impedance variations of said stage and which is free from reactive currents introduced by interelectrode capacitance of said electron valve, said circuit means including in combination, feedback transformer having primary and secondary windings and further having first and second auxiliary windings, means for series connecting said primary winding between the cathode electrode of said electron valve and ground reference potential, means connecting one end of said first auxiliary winding to said control electrode, variable capacitor means coupling the other end of said first auxiliary winding to said ground reference potential, means connecting one end of said second auxiliary winding to said ground reference potential, circuit means including variable capacitor means coupling the other end of said second auxiliary winding to said anode electrode, the current in said auxiliarly windings acting to neutralize reactive currents introduced in said primary winding by interelectrode capacitance of said electron valve, and means coupled to said secondary winding including resistance means for providing a feedback signal proportional to the electronic current flowing in the anode-to-cathode electrode path in said electron valve.

3. In a tuned radio frequency amplifier stage including an electronic valve having at least anode, cathode and control electrodes, circuit means for providing a feedback signal which is substantially independent of load impedance variations of said stage and which is free from reactive current components introduced by interelectrode capacitance of said electron valve, said circuit means including in combination, a signal sampling feedback transformer having primary and secondary windings and further having an auxiliary winding, means for series connecting said primary winding in the anode to cathode circuit of said electron valve, means connecting one end of said auxiliary winding to ground reference potential, circuit means including capacitance means coupling the other end of said auxiliary winding to said anode electrode, the current in said auxiliary winding acting to neutralize reactive current introduced in said primary winding by interelectrode capacitance of said electronic valve, and means coupled to said secondary winding including resistance means across which is developed a feedback signal proportional to the electronic current flowing from anode to cathode in said electronic valve.

4. In a tuned radio frequency amplifier stage including an electron valve having anode, cathode, control grid and screen grid electrodes, circuit means for providing a negative feedback signal which is substantially independent of load impedance variations of said stage and which is free from reactive currents introduced by interelectrode capacitance of said electron valve, said feedback circuit means including in combination, transformer means having primary and seondary windings and further having first and second auxiliary windings, means connecting said primary winding between said cathode electrode and a reference potential, means connecting one end of said first auxiliary winding to said control grid electrode, means including a variable capacitor series connecting the other end of said first auxiliary winding to said reference potential, means connecting one end of said second auxiliary winding to said reference potential, circuit means including a variable capacitor connecting the other end of said second auxiliary winding to said anode electrode, means connecting one end of said secondary winding to a reference potential, and circuit means including resistance means connecting the other end of said secondary winding to said reference potential to develop across said resistance means a feedback voltage proportional to the anode-to-cathode electronic current of said electron tube.

5. In a tuned radio frequency screen grid amplifier stage capable of developing a current feedback signal to be coupled to proceeding stages for the reduction of intermodulation distortion therein, with said feedback signal being substantially independent of load impedance variations of said stage and free from reactance signal components caused by interelectrode capacitance of the electron tube of said stage, the improvement including a feedback current sampling transformer having a primary winding series connected between the cathode electrode of the electron tube of said stage and a reference potential, a secondary winding to provide a feedback signal proportional to the anode-to-cathode signal current of said tube, a first auxiliary winding coupled between the control grid electrode of said tube and the reference potential to neutralize reactive currents introduced in said primary winding by the control grid to cathode interelectrode capacitance of said tube, a second auxiliary winding coupled between the anode electrode of said tube and the reference potential to neutralize currents in said primary winding caused by the anode radio frequency voltage acting through the output interelectrode capacitances of said tube, and means coupled to said secondary winding including resistance means connected to the reference potential for developing said feedback signal across said resistance means.

6. In radio frequency apparatus having a tuned output stage including a vacuum tube with a plate current path, which stage is productive of unwanted frequencies arising from intermodulation products generated by nonlinear active elements in said apparatus, circuit means for deriving a current feedback signal from said output stage to be applied to preceding stages for reduction of such intermodulation products, said circuit means including in combination, a current sampling transformer having a primary winding and a secondary winding, said primary winding being connected in series with the plate current path of said tube, means to develop a feedback signal in said secondary winding of said transformer proportional to the current in said plate current path, and means to introduce reactive currents in said primary winding of said transformer in a sense opposing reactive currents in the plate current path of said tube, whereby said transformer provides a feedback signal proportional only to electronic plate current, and means connected to said secondary winding including resistance means across which is developed a signal substantially independent of variations of the output impedance of said tube and substantially free from reactive current components introduced by interelectrode capacities of said tube.

7. A tuned radio frequency amplifier stage including in combination, an electron tube having anode, cathode and control electrodes, means for applying operating voltages to said electrodes, a tuned input circuit connected to said control electrode, and an output circuit connected between said anode and cathode electrodes, said output circuit including tuned circuit means across which a radio frequency signal is developed, and a current sampling transformer having a primary winding series connected in the anode to cathode current path of said tube, said transformer having a secondary winding in which is developed a feedback signal proportional to the current in said anode current path, and means to introduce reactive current in said transformer in a sense opposing reactive current in the anode to cathode current path of said tube so that said secondary winding of said transformer provides a feedback signal proportional to anode to cathode current and which is substantially independent of impedance variations of said output circuit and wherein reactive current components introduced by said tube are substantially removed.

8. A tuned radio frequency amplifier stage including in combination, an electron tube, anode, cathode and control electrodes, with said stage having means for applying operating voltages to said electrodes and tuned input and output circuit means for translating a radio frequency signal, a current sampling transformer having a primary winding connected in the anode-cathode current path of said tube and a secondary winding providing a feedback signal proportional to the current in said anode-cathode current path, said transformer having an auxiliary winding coupled to said anode electrode of said tube and wound in a sense to induce currents in said transformer opposing the reactive currents introduced in the anode-cathode current path of said tube, so that said secondary winding of said transformer provides a feedback signal proportional to current in said anode-cathode current path which is substantially independent of impedance variation of said output circuit means, and which is substantially free from reactive current components introduced in said anode-cathode path by interelectrode capacities of said tube.

References Cited by the Examiner

UNITED STATES PATENTS

| | | | |
|---|---|---|---|
| 1,792,961 | 2/31 | Ballantine | 330—79 |
| 1,841,281 | 1/32 | Elliott | 330—79 |
| 1,861,587 | 6/32 | Snow et al. | 330—79 |
| 1,899,758 | 2/33 | Jarvis | 330—79 |
| 1,912,891 | 6/33 | Drake | 330—79 |
| 2,293,414 | 8/42 | Strutt et al. | 330—79 |

DAVID G. REDINBAUGH, *Primary Examiner.*